INVENTORS
HERMAN G. KLEMM
MELVILLE J. MITCHELL

ATTORNEYS

INVENTORS
HERMAN G. KLEMM
MELVILLE J. MITCHELL
BY

ATTORNEYS

June 12, 1956

H. G. KLEMM ET AL
TRACTOR-IMPLEMENT HITCH MECHANISM
WITH POWER TAKE-OFF AND BOOSTER 2,749,995

Filed April 7, 1951

INVENTORS
HERMAN G. KLEMM
MELVILLE J. MITCHELL
BY

ATTORNEYS

Fig. 14

United States Patent Office 2,749,995
Patented June 12, 1956

2,749,995

TRACTOR-IMPLEMENT HITCH MECHANISM WITH POWER TAKE-OFF AND BOOSTER

Herman G. Klemm and Melville J. Mitchell, Birmingham, Mich., assignors to Harry Ferguson, Inc., Detroit, Mich., a corporation of Delaware Application April 7, 1951, Serial No. 219,798

9 Claims. (Cl. 180—14)

The invention relates to hitch mechanisms for connecting implements to tractors.

Arrangements are well known for ready attachment of mounted implements. For example, the "Ferguson" tractor is provided at its rear end with a set of three hitch links each having a swivel mounted apertured ball on its trailing end. To attach a suitable mounted type implement one has only to insert three triangularly located pins on the implement in corresponding ones of the balls. Raising and lowering of the implement so attached can then be accomplished by simply raising or lowering the hydraulically operated linkage.

Some implements are, however, so bulky and heavy that they cannot be accommodated on such a three-point hitch. Examples are combines, forage harvesters, hay balers, etc. The weight and dimensions of those implements are such that they can, at most, be arranged only in a semi-mounted style, that is to say, with at least some portion of their bulk supported on a separate ground wheel.

It is with the solution of the problems of attaching such semi-mounted implements to a tractor that the present invention is concerned.

One general object of the present invention is to provide a hitch mechanism for attachment of semi-mounted implements which can, on the one hand, be easily and simply connected to the tractor, indeed practically "snapped" on so to speak, and which on the other hand does not constitute an integral part of the implement itself with attendant necessity of duplicating it in each implement to be accommodated.

To that end we have provided what amounts to an intermediate hitch mechanism interposed between tractor and implement. It is of such character that it can be readily attached to or detached from the tractor to accommodate the latter for either semi-mounted or mounted implements as required. With equal ease one semi-mounted implement can be substituted for another in attachment to the mechanism thus making the latter, in that sense, of universal applicability.

Moreover it has been our object to provide such an intermediate mechanism which is readily adapted to apply power for driving parts of the implement either through power take off connections from the tractor or through an auxiliary engine carried on the intermediate mechanism itself.

The invention also resides in the attachment means on the implement itself for receiving the intermediate attachment mechanism.

Other objects and advantages of the invention will become apparent from the following detailed description of the preferred embodiment illustrated in the accompanying drawings, in which.

For purposes of illustration the hitch mechanism comprising the invention has been shown in a form particularly suitable for connecting semi-mounted implements with a lightweight four-wheeled agricultural tractor. It is to be understood that the hitch mechanism is not limited to use with that particular type of tractor, nor is its use restricted to the implements illustrated by way of example. It is also to be understood that various changes, modifications and adaptations may be made in the form, construction and arrangement of the parts of the mechanism without departing from the spirit and scope of the invention as expressed in the appended claims.

Referring to Figs. 1–4 of the drawings, the tractor T with which the improved hitch mechanism is shown has an elongated body 20, front and rear axles 21 and 22, front wheels 23 and rear wheels 24, the latter constituting the drive wheels. The exemplary tractor is equipped with a power operated hitch linkage of the type disclosed in the Ferguson Patent No. 2,118,180, dated May 24, 1938, including a pair of forwardly converging draft links 25 pivoted at their forward ends as at 26 on the tractor body below and slightly forward of the rear axle 22. The links 25 are supported by drop links 27 from power operated crank arms 28 pivoted on the tractor body. These lower links are utilized to transmit the draft force from the tractor to the hitch mechanism and the implement associated therewith as will appear presently.

In carrying out the invention, we provide an open sided frame 30 adapted for quick detachable connection with and disconnection from an implement and a rear member 31 and a front member 32 extending generally laterally and spaced apart for connection with longitudinally spaced points on the tractor. The frame 30 in its preferred form as shown in Figs. 1 to 5, is generally C-shaped and the members 31 and 32 are connected by a longitudinal member 33 by which connection is established with an implement as will appear presently. The frame members may be of any suitable form, the rear member 31, as shown, comprising a deeply flanged inverted channel dimensioned to provide the strength and rigidity required for the transmission of the draft force from the tractor to the implement coupled to the hitch mechanism. The members 32 and 33 are preferably of tubular construction affording maximum strength and rigidity with a minimum of weight.

In the assembled frame 30, the rear member 31 is disposed substantially at right angles to the member 33 and is secured adjacent the rear end thereof as by welding. A heavy gusset plate 34 welded to the two frame members imparts rigidity to the structure. The front frame member 32 is secured, as by welding to the forward end of the member 33, and this joint is reinforced by a gusset plate 35. In the exemplary frame structure, the front member 32 is angled forwardly with reference to the longitudinal member 33 to facilitate its connection with the tractor, as will appear presently.

The frame thus formed is dimensioned to extend across the back of the tractor T from a point adjacent the rear end thereof, thence forwardly outside the driving wheel 24 to a point located ahead of the center of the tractor body 20. Provision is made for releasably connecting the free ends of the frame members 31 and 32 to the tractor at the two longitudinally spaced points mentioned above and further for releasably coupling the frame to an implement so as to position it at the side of the tractor for convenient visual supervision by the tractor operator.

Preferably, detachable connection of the hitch frame to the tractor T is effected by coupling means of the general type disclosed in the copending application of Noral A. Nelson, Serial No. 218,636 filed March 31, 1951 (now Patent 2,707,043). The coupling means thus includes coupling elements on the front and rear frame members together with coacting coupling elements on the tractor constructed and arranged for quick and easy interengagement without requiring complicated maneuvering of the tractor. More particularly, the coupling elements on the rear frame member and at the rear of the tractor are constructed so that they may be engaged by simply backing the tractor up to the frame with the elements approximately in line, as shown in Fig. 5.

Moreover, the rear coupling elements embody a construction which permits pivoting of the frame relative to the tractor about a substantially vertical axis. Accordingly, after engagement of the rear coupling, farther backing of the tractor causes the frame to swing around or jackknife, as indicated by the arrow A in Fig. 5, to engage the elements of the front coupling. Conversely, disconnection of the frame from the tractor may be effected by releasing the front coupling and driving the tractor forwardly to swing the frame outwardly about the pivot afforded by the rear coupling. When the frame has been swung to the position shown in Fig. 5, the rear coupling elements may be disengaged to release the frame from the tractor and the latter may then be driven away in a forward direction.

Figure 1:
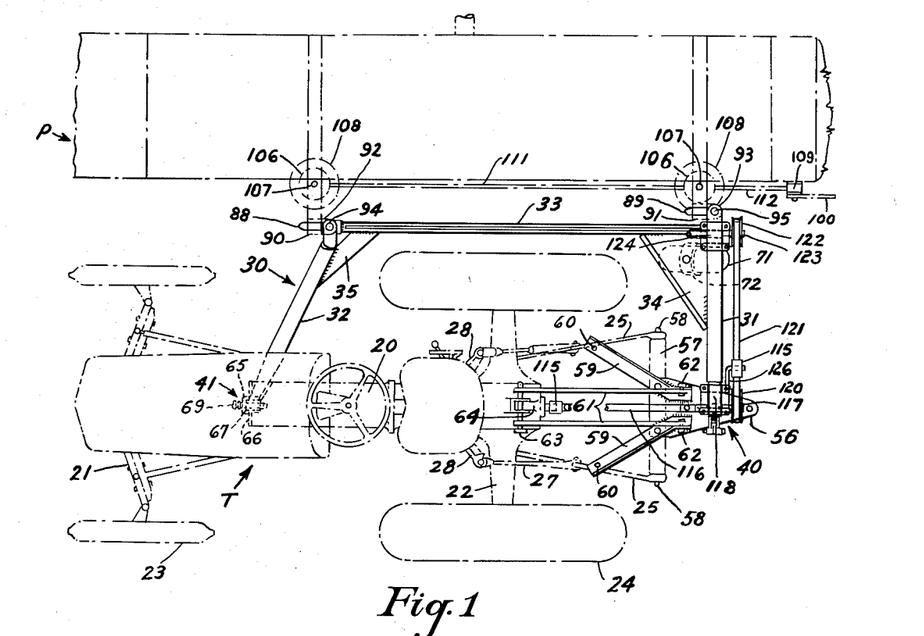
Figure 1 is a plan view of a tractor and semi-mounted implement connected by a hitch mechanism embodying the features of the invention.
Figure 2:
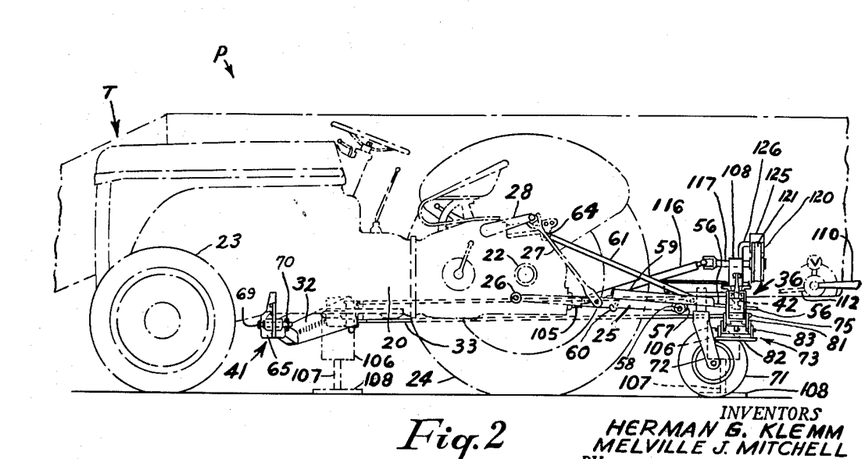
Fig. 2 is an elevational view of the tractor and hitch mechanism with the driving wheel at the near side of the tractor omitted for clarity.
Figure 5:
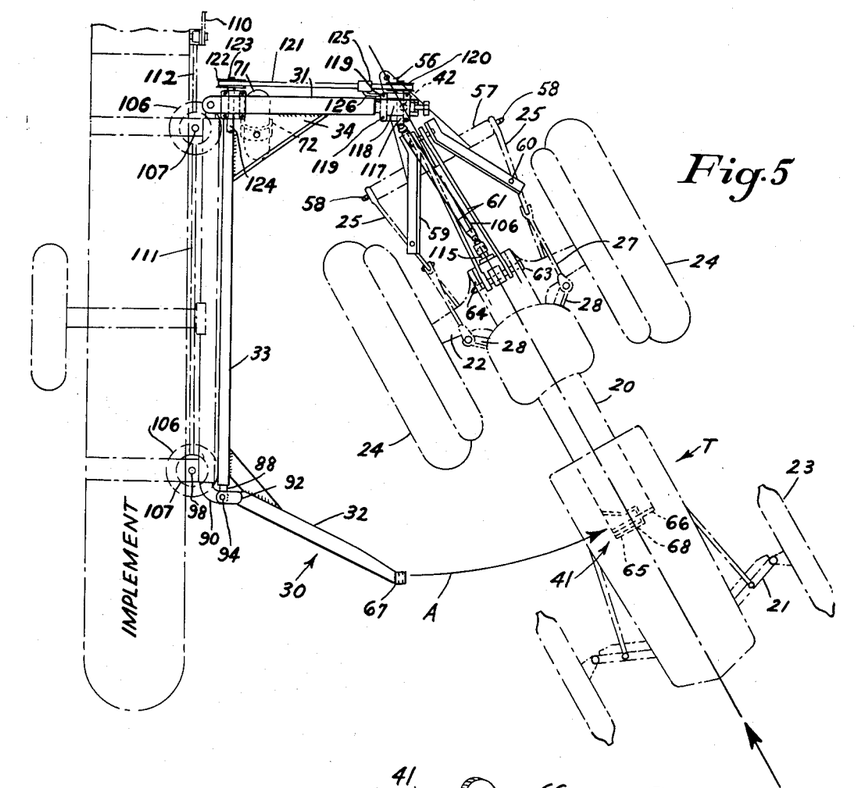
Fig. 5 is a diagrammatic view showing the manner in which the connection between the hitch mechanism and the tractor is effected while the hitch mechanism is attached to an implement.

To permit connection and disconnection of the hitch mechanism in the above manner, the rear coupling indicated generally at 40 in Figs. 1 and 5 is constructed and arranged so that the cooperating elements may be operatively engaged without requiring preliminary exact alinement and after engagement to afford a universal swiveling connection between the frame and the tractor. The point of connection is preferably at or near the rear end of the tractor and its lateral location may be anywhere between the implement and the center line of the tractor, the latter being shown in the present case.

Figure 6:
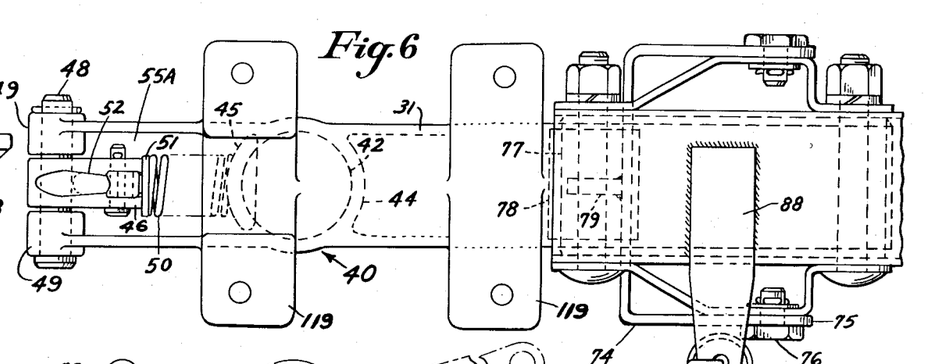
Fig. 6 is a fragmentary plan view of the rear portion of the hitch mechanism showing the means for effecting a connection adjacent the rear of the tractor.
Figure 7:
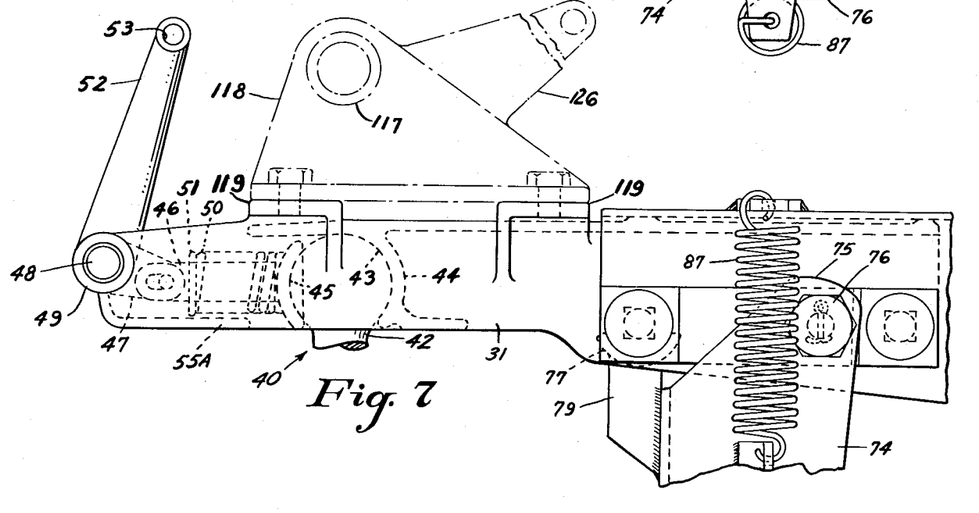
Fig. 7 is an end elevational view of the structure shown in Fig. 6.
Figure 8:
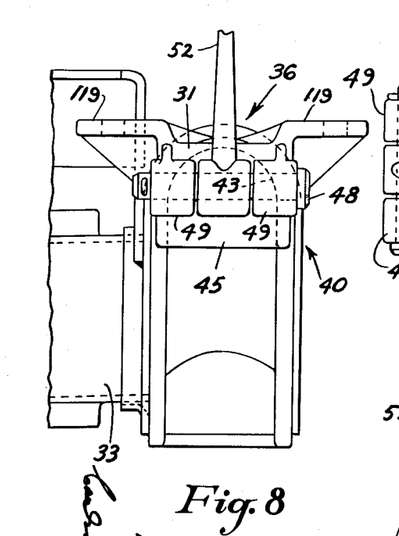
Fig. 8 is a side elevational view of the structure shown in Figs. 6 and 7.

The coupling 40 preferably comprises a ball element 42 (Figs. 2, 6 and 7) carried by one of the parts to be connected and a socket element 43 carried by the other part. In the exemplary mechanism shown in Figs. 1–13, the socket element 43 is carried by the rear frame member 31 of the hitch mechanism and, as shown in Fig. 7, includes a transverse web 44 integral with the frame member 31 and a retractable shoe 45 supported in spaced relation to the web. The opposed surfaces of the web and shoe are formed with a spherical bearing surface adapted to closely embrace the ball element 42 so as to retain it in place while permitting universal swiveling movement within predetermined limits.

For convenience of engagement and disengagement of the elements of the coupling 40, the shoe 45 is supported so that it may be shifted laterally away from the opposed web 44, thus opening up the socket relatively wide for the reception or withdrawal of the ball 42. To this end, the shoe 45 is provided with a laterally extending stud 46 having a lost motion connection with one arm 47 of a bell crank lever pivoted on a shaft 48 mounted in laterally spaced bearings 49 formed in the bifurcated end of the frame member 31. A compression spring 50, coiled around the stud 46, bears at one end against the rear face of the shoe 45 and at the other end against a thrust collar 51 slidable on the stud and positioned for engagement by the end of the arm 47. The arrangement is such that when the bell crank is rocked to the position in which it is shown in Fig. 7, the arm 47 acts to cam the collar 51 to the right and thus through the spring 50 urge the shoe 45 into clamping engagement with the ball element 42. The other arm 52 of the bell crank lever is formed at its free end with an aperture 53 for the reception of a pin (not shown)) by which it may be securely latched to a part rigid with the frame member 31.

To retract the shoe 45 for effecting engagement or disengagement of the coupling elements, the pin 54 is withdrawn and the lever arm 52 is rocked in a counterclockwise direction as viewed in Fig. 7. The arm 47 is thus withdrawn from engagement with the thrust collar 51, thereby relieving pressure on the spring 50. Continued movement of the bell crank lever in the retracting direction serves to draw the shoe 45 outwardly or away from the web 44 to open the socket. A transverse horizontally disposed web 55a, formed in the frame member 31, extends below the stud 46 and serves to maintain the shoe substantially in alinement with the web 44 when withdrawn to retracted position as above explained.

The ball element 42 of the coupling 40 is carried by the tractor and may be mounted thereon in any suitable manner. When applied to tractors equipped with the Ferguson power operated hitch linkage, the ball element 42 is conveniently mounted on a supporting plate 56 (Figs. 2 and 3) bolted or otherwise rigidly secured to a drawbar 57 connected between the trailing draft links 25 by means of the usual end pins 58 engaging in socketed balls provided at the ends of the links. To hold the supporting plate 56 against tilting, a pair of rigid arms, herein shown as angle bars 59, are welded at one end to the plate and are extended forwardly and outwardly so as to overlie the draft links 25 intermediate their ends. Suitable fasteners, such as hook elements 60, secure the arms to the links.

When the improved hitch mechanism is in use, the power lift action of the draft links is not required. Accordingly, the linkage and the ball supporting plate 56 may be rigidly locked in a fixed position. Such locking is conveniently effected by stay bars 61, each anchored at one end to the plate 56 as by studs 62 on the upstanding flanges of the angle bars 59. At their other ends, the bars 61 are apertured for the reception of a pin 63 insertable through apertured studs 64 normally provided on the tractor body.

The final step in connecting the hitch frame to the tractor is the operative engagement of the elements of the front coupling 41. To simplify and facilitate this operation, the coupling elements are constructed and located so that such engagement may be effected as an incident to the swinging or jack-knifing of the frame and without manual intervention. That is to say, the coupling elements are so constructed that they automatically interengage when the front frame member 32 or 32' is swung inwardly toward the tractor.

The coupling 41 as shown includes a tapering or outwardly flaring cup-shaped element 65 (Figs. 2, 4 and 9) adapted to be mounted on the tractor in any preferred manner. In the embodiment illustrated, this element is located closely adjacent the center line of the tractor and is attached to the underside of the tractor body adjacent the point where the engine is joined to the section of the tractor body housing the transmission. For this purpose the element 65 is formed with an arcuate anchoring strip 66 having holes spaced apart so as to register with those in the flanges by which the tractor body section and engine are bolted together.

The coupling element 65 is mounted with its flaring open end facing the implement side of the tractor to receive a cooperating coupling element 67 formed on or rigidly secured to the free end of the front frame member 32 or 32'. The coupling element 67 is substantially smaller in its transverse dimensions than the open end of the element 65 and its end is preferably rounded to enable it to slide into the latter element even though not precisely alined therewith. The flaring or inclined walls of the element 65 thus serve to guide the element 67 into position.

Any suitable means may be utilized for retaining the coupling elements 65 and 67 in engaged relation. In the exemplary construction, the element 67 is formed with a transverse bore adapted to aline with apertures 68 in the front and rear walls of the element 65 for the reception of a headed coupling pin 69. A retaining pin or key 70, insertable in a transverse hole in the pin 69 cooperates with the head to prevent accidental withdrawal of the pin.

The coupling elements 65 and 67 are, in this instance, positoned so that the axis of the coupling pin 69, when engaged, is on the longitudinal axis of the tractor. The important consideration is that the axis of the pin is alined with the rear coupling 40 thus permitting relative pivoting movement between the tractor and the frame to conform to changes in ground contour without imposing undue stress on the tractor, the frame, or the couplings. At the same time, the hitch frame is rigidly held in predetermined axial relation to the tractor so that the implement associated with the frame is maintained in the correct position with respect to the tractor at all times.

To assist in locating the coupling elements for convenient engagement and to carry a part of the load imposed on the hitch device, the frame 30 is provided with an auxiliary or ground wheel 71 adjacent its rear end. In the construction shown in Figs. 3 and 4, for example, the wheel is journaled in a castering fork 72 pivoted to the rear frame member 31 closely adjacent its connection with the longitudinal member 33. This wheel relieves the tractor of a part of the load imposed on the hitch mechanism, and in cooperation with the ground wheel ordinarily provided on the implement permits the implement to be moved about easily when it is disconnected from the tractor. Furthermore, the wheel 71 provides a support upon which the frame may pivot in the course of connecting the hitch mechanism to the tractor as heretofore described.

The hitch frame 30 may also be provided at its rear end with an auxiliary stationary support adapted to be retracted when the hitch is in use. This support may be of any preferred construction. In the form of the hitch shown in Figs. 1-12, for example, the rear frame member 31 is provided with a supporting stand 73 (Fig. 10) constructed so that it can be folded into an out of the way position after the connection is established. As will be seen by reference to Figs. 6, 7 and 10, the stand comprises a channel-shaped upper member 74 having its side flanges extended to form ears 75 spaced apart so as to straddle the member 31. These ears are pivotally connected to the frame member 31, as at 73, thus allowing the member to be swung about a transverse axis into closely embracing relation to the frame member.

To relieve the pivot connection of the weight of the frame when the stand is extended, an abutment in the form of the transverse bar 77 is welded to the frame member 31 and is positioned to be engaged by an arcuate shoe 78 carried by a bracket 79 welded to the outer face of the stand member 74.

Pivotally secured to the lower end of the upper member 74, as at 80, is a lower channel-shaped member 81 adapted to be extended substantially parallel to the upper member or to fold flatly against the same. The member 81 is provided at its lower end with a ground engaging shoe 82, the shoe being pivoted to the member as at 83 to permit folding over against the side of the member when not in use.

Figures 9, 10:
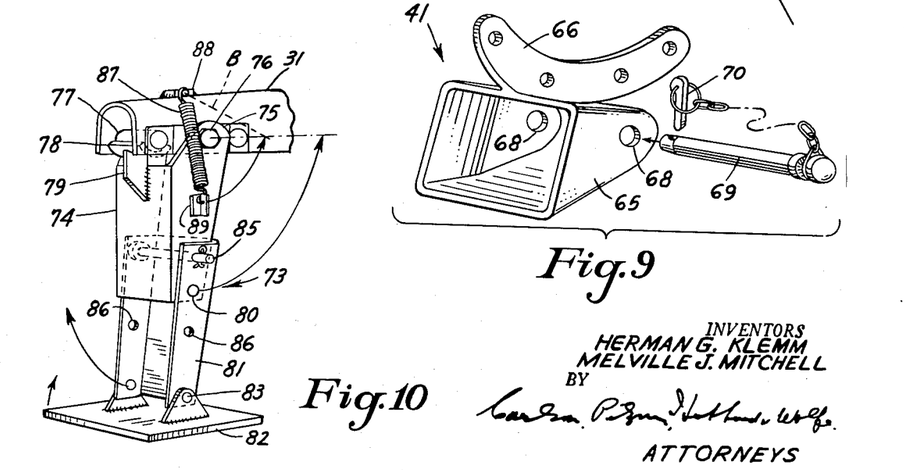
Fig. 9 is an exploded perspective view showing details of the connecting structure provided on the tractor for association with the forward end of the hitch mechanism.
Fig. 10 is a perspective view showing details of the supporting stand provided on the hitch mechanism.

Provision is made for locking the stand members 74 and 81 in either extended or folded position. For this purpose the pivotal connection 80 is spaced substantially below the upper end of the lower member so that in extended position the two members overlap substantially as shown in Fig. 10. These overlapping portions are suitably apertured for the reception of a locking pin 85. Other apertures 86 in the member 81 between its lower end and the pivot 80 are adapted to aline with the apertures in the member 74 when the members are folded so that the pin 85 may be inserted to retain them in such folded positions.

The stand is releasably retained in either folded or extended position with respect to the frame 30 through the medium of an over-center spring 87 connected between a lug 88 on the frame member 31 and a lug 89 projecting from one side of the stand member 74. These lugs are so positioned that when the stand is folded the spring is positioned to the right of the pivot 76, as indicated by the broken line B, and is thus effective to maintain the stand members folded securely against the frame member. When the stand is extended the spring 87 is swung to the other side of the pivot 76, as shown in Fig. 10, thus tending to maintain the shoe 78 in engagement with the abutment 77.

The construction of the improved hitch mechanism for convenient interchangeable coupling with different implements and to provide, in each instance, a rigid unitary structure, affords maximum flexibility as regards tractor-implement combinations available for quick use, thus enabling the equipment to be used most efficiently and materially reducing over-all equipment costs. With the construction herein shown, the frame 30 of the mechanism when coupled with an implement in the manner contemplated by the present invention, forms in effect a part of the implement frame and permits considerable simplification of the structure permanently associated with the implement. Moreover, with this arrangement a single power source as, for example, an auxiliary engine, is enabled to effectively serve any number of different implements. Further, in this connection and by virtue of the disengageable coupling of the hitch mechanism with the tractor, the auxiliary engine may be conveniently utilized as a stationary power source while the tractor is used for other purposes.

The coupling means provided by the invention not only affords a strong and rigid connection between the hitch mechanism and an implement, but it is further characterized by the facility with which the hitch mechanism may be coupled with and uncoupled from the implement. In general, this coupling means includes a pair of elements on the hitch frame engageable with elements on the implement by relative fore and aft movements of the implement and frame and effective when engaged to restrain the frame and implement against movement in one plane. A second pair of elements on the frame engageable with elements on the implement after engagement of the first mentioned pairs of elements serve to prevent relative movement of the frame and implement in a plane at right angles to the first mentioned plane. The over-all action of the coupling means is, therefore, to prevent relative movements between the frame and implement in any direction.

Figure 4:
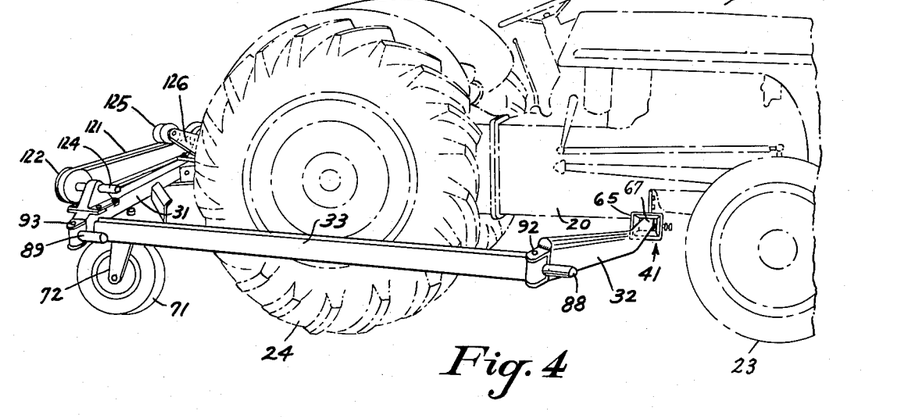
Fig. 4 is a perspective view of the hitch mechanism and the tractor as viewed from the side at which the implement is attached.
Figure 14:
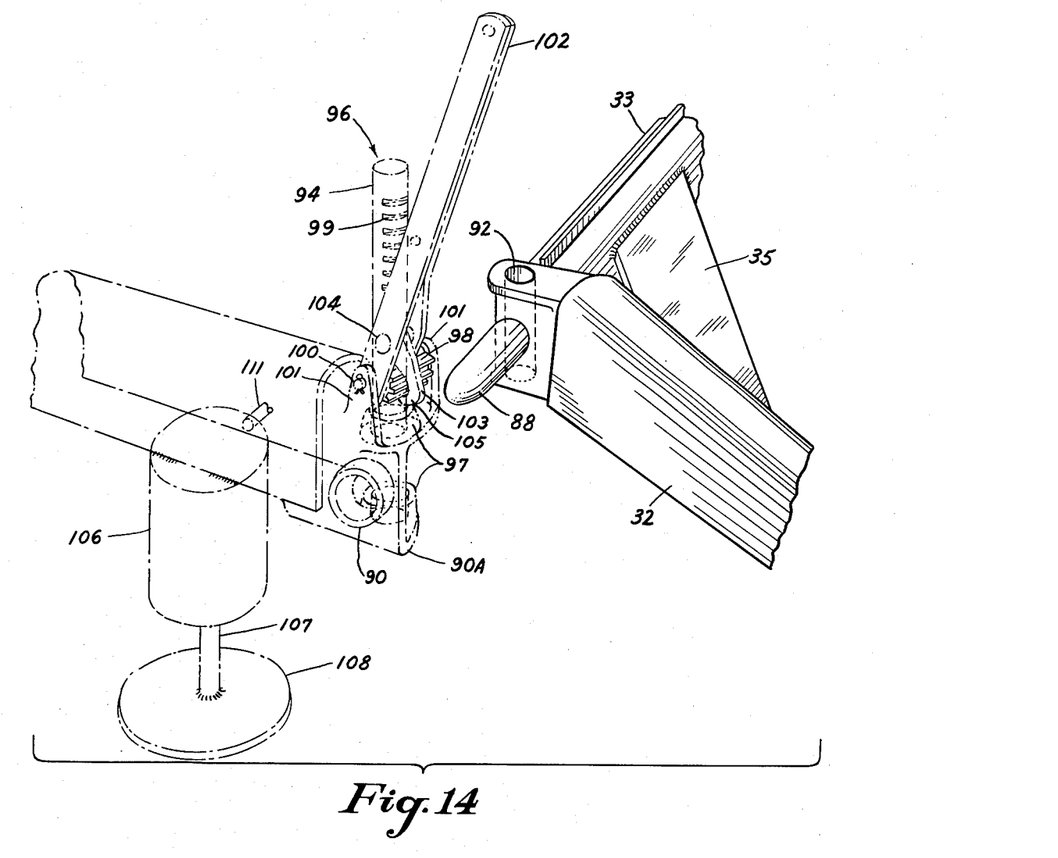
Fig. 14 is a perspective view showing details of the coupling elements provided on an implement and on the hitch mechanism for disengageably coupling them together.

In its preferred form the coupling means comprises a pair of horizontally disposed forwardly projecting pins 88 and 89 (Figs. 1, 11 and 14) respectively mounted adjacent the front and rear ends of the frame member 33. The pin 88 may be substantially in axial alinement with the frame member as shown in Fig. 14, while the companion pin 89 is offset laterally toward the implement side of the frame member, as shown in Figs. 1 and 4. The pins 88 and 89 are adapted to engage in socket elements 90 and 91 positioned on the implement frame similarly to the pins as shown in Fig. 1. These sockets may be conveniently formed in fittings 90a rigidly attached in any suitable manner to the implement frame, the sockets being dimensioned to receive the pins with a snug fit and thus establish a firm connection between the frame and the implement. Entry of the pins into the sockets is facilitated by forming the pins with tapered ends.

To make the connection between the frame and implement a rigid one, a second transversely arranged pin and socket coupling is provided adjacent each of the pin and socket couplings above described. More specifically, the second couplings are arranged with the pin axis disposed at right angles to the axes of the pins 88 or 89, or in this instance substantially vertically. The second couplings as herein shown comprise socket elements 92 and 93 provided at opposite ends of the frame member 33 closely adjacent the pins 88 and 89. The socket fittings 90a of the implement, in turn, are formed with suitable extensions spaced apart to straddle the socket elements 92 and 93 and these extensions are apertured to receive pins 94 and 95 which connect them rigidly with the socket elements.

The extensions of the fittings 90a are positioned so as to automatically aline their apertures with the sockets 92 and 93 when the pins 88 and 89 are securely engaged in the first mentioned socket elements. When so alined, the pins 94 and 95 may be readily inserted in the apertures either by hand or by actuating mechanism 96 such as that shown in Fig. 14 of the drawings. In either case, engagement of the pins 94 and 95 in the sockets 92 and 93 in crossed relation to the companion pins and sockets provides a strong and rigid connection effectively preventing relative movements of the hitch mechanism and implement in any direction.

Referring to Fig. 14, the pin actuating mechanism 96 facilitates insertion and withdrawal of the pins 94 and 95 by providing a conveniently accessible force applying lever for that purpose. Furthermore, provision may be made for retaining the pins in assembled relation with the mechanism after withdrawal from the sockets 92 and 93, thus eliminating the possibility of the pins being misplaced or lost. In the exemplary embodiment, the pins are retained while in withdrawn position by guide sleeves 97 formed on the fittings 90a.

The actuating mechanism 96 for each pin, as herein shown, comprises a pinion 98 rotatably supported on the fitting 90a at one side of the associated pin and in mesh with rack teeth 99 formed on the side of the pin. In the present instance, the pinion is journaled on a shaft 100 carried between upstanding lugs 101 provided on the fitting 90a. The shaft 100 also serves as a pivot for a hand lever 102 having one end bifurcated to provide spaced legs adapted to straddle the pinion 98 and apertured to receive the shaft. A pawl 103 is pivoted at one end on a stud 104 carried between the legs of the lever 102. At its other end, the pawl is formed with a laterally directed nose portion 105 engageable with the teeth of the pinion 98 whereby the pinion may be rotated step-by-step in either direction by appropriate manipulation of the hand lever. Such rotation of the pinion, of course, is effective to enter the associated pin 94 or 95 in the socket 92 or 93 or to withdraw the pin from the socket.

When the hitch mechanism is coupled to an implement in the above described manner, the frame 30 becomes, in effect, a part of the implement frame. More particularly the longitudinal frame member 33 is enabled to serve as a structural element of the implement frame. The latter frame may, therefore, be materially simplified and of less rugged construction than is necessary when the implement is to be connected to the tractor in accordance with prior practices. Substantial savings in initial cost are thus obtained without sacrifice of durability or operating efficiency.

Implements designed for use with the disengageable hitch mechanism are desirably provided with some means for supporting the implement when disengaged so that the sockets 90 and 91 are at substantially the same level at which the pins 88 and 89 of the hitch mechanism are supported by the tractor and the ground wheel 71. The pins may thus be engaged in the sockets by simply driving the tractor and attached frame alongside the implement with the frame close enough to the latter to line up the pins approximately with the sockets. Accurate alinement of the pins and sockets is not required since the tapered ends of the pins will find their way into the sockets readily even if slightly misalined.

In the implement shown in Figs. 1, 2, 5 and 14 of the drawings, the supporting means comprises a pair of vertically disposed jacks mounted on the implement frame adjacent the front and rear ends of the implement. Each jack comprises a cylinder 106 with a plunger 107 projecting from its lower end and carrying a ground engaging shoe 108.

Pressure fluid is supplied to the jack cylinders from any suitable source such as a pump 109 (Fig. 5) operated manually by a handle 110. Preferably the jacks are connected to the pump by separate conduit systems 111 and 112, so that jacks may be operated independently to level up the implement. It will be understood, of course, that suitable control valves are provided in the conduit systems so that the jack plungers can be extended to implement supporting position or retracted to an out of the way position, as desired.

In accordance with another aspect of the invention, the improved hitch mechanism may be equipped for supplying power to a connected implement either from the tractor engine or from an auxiliary engine mounted on and forming a part of the mechanism. When the tractor engine constitutes the source of power, the power take-off shaft 115 of the tractor is connected by conventional couplings and a universally jointed connecting shaft 116 with a drive shaft 117 journaled in a bearing 118 mounted on the rear frame member 31 of the hitch mechanism. As will be seen by reference to Figs. 6 and 7 of the drawings, this frame member is formed with integral mounting flanges 119 to which the bearing may be bolted.

Figure 3:
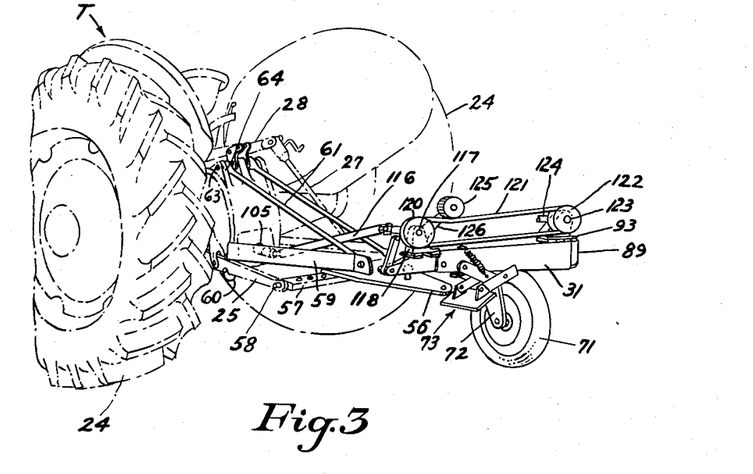
Fig. 3 is a perspective view of the hitch mechanism as viewed from the rear of the tractor.

As shown in Fig. 3, the shaft 117 carries a pulley 120 drivingly connected by a belt 121 with a pulley 122 fast on a shaft 123 journaled in a bearing 124 mounted on the frame 30 closely adjacent the junction of the members 31 and 33. The shaft 123 is arranged with its axis substantially parallel to the frame member 33 and may be connected with the implement in any preferred manner as by conventional couplings and a universally jointed shaft (not shown). An idler pulley 125 carried by an arm 126 pivotally supported as the bearing 118 is provided for adjusting the tension of the belt 121.

Figures 11, 13:
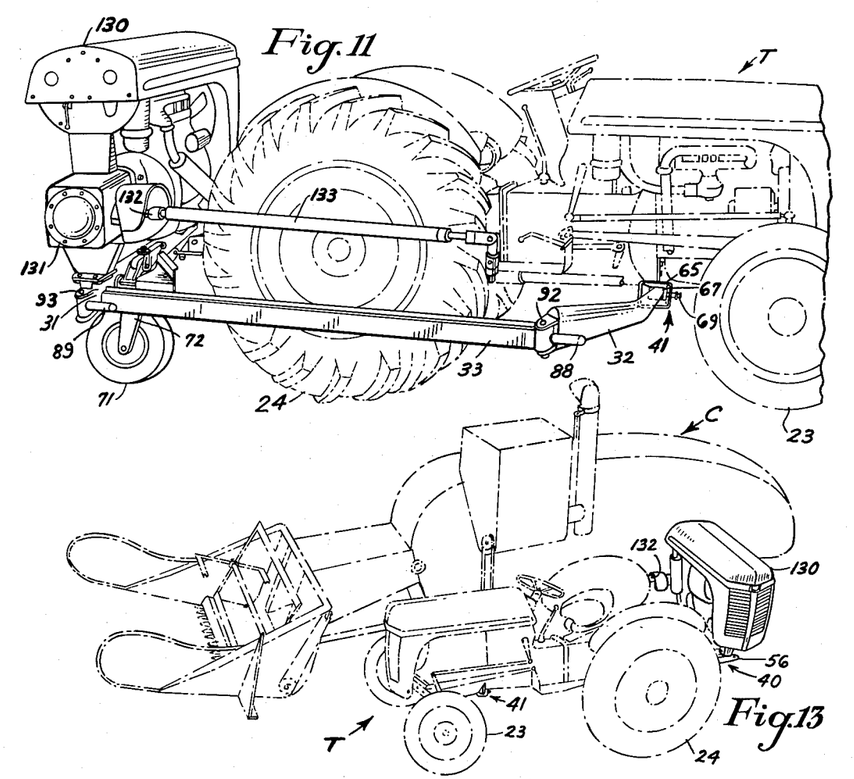
Fig. 11 is a perspective view of the hitch mechanism connected to a tractor and equipped with an auxiliary engine for supplying power to an implement.
Fig. 13 is a perspective view of the hitch mechanism shown in Figs. 11 and 12 as used to connect a combine to the tractor.
Figure 12:
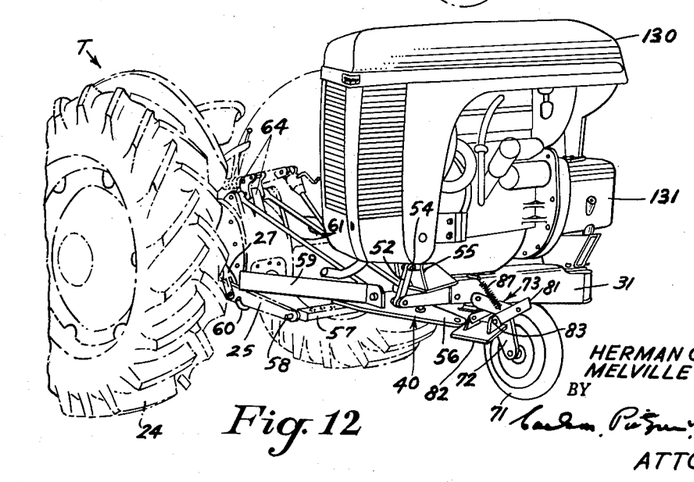
Fig. 12 is a perspective view of the hitch mechanism shown in Fig. 11 as viewed from the rear of the tractor.

Alternative to the above, an auxiliary engine 130 may be mounted on the flanges 119 of the frame member 31, preferably with its drive shaft disposed parallel to the rear frame member 31, as shown in Figs. 11–13. The weight of the engine is thus supported largely by the ground wheel 71 of the hitch mechanism, and moreover the engine is located in a position such that it does not interfere with the connecting and disconnecting of the hitch mechanism and tractor or obstruct the operator's view of the implement. In the particular embodiment illustrated the engine 130 is provided with a gear box 131 having its output shaft 132 disposed above and substantially parallel to the frame member 33. Connection with the implement may be effected by any conventional coupling means such as a universally jointed shaft 133.

Simply by way of illustration, a corn planter P (Figs. 1 and 2) and a combine C (Fig. 13) have been shown connected with the tractor T by the improved hitch mechanism. It will be appreciated, however, that the hitch mechanism may be used to advantage with other types of implements as, for example, with hay balers, forage harvesters, etc.

Irrespective of the type of implement with which the hitch mechanism is associated, connection with or disconnection from the tractor may be effected quickly and easily by one man. When the implement is disconnected from the tractor the rear end portion of the hitch frame 30 is supported jointly by the implement and the stand 73, with the socket element 43 of the rear coupling disposed so that the ball element 42 can be positioned for engagement therein by simply backing up the tractor in either a straight line as indicated in Fig. 5 or with the front wheels turned to swing the forward end of the tractor toward the implement. The rear socket element, of course, is opened up at this time by the retraction of the shoe 45 so that accurate alinement of the elements is not essential. With the parts approximately alined as above indicated the stand 73 is collapsed, allowing the frame to descend and engage the socket element over the ball. The shoe 45 is shifted to clamping position by rocking the lever arm 52 which, of course, is then locked in place by the pin 55. Alternatively, if desired, the stay bars 61 may be temporarily released by withdrawal of the pin 64 so that the entire hitch linkage of the tractor may be elevated by the power means provided on the tractor to engage the ball element in the companion socket. After the stand 73 is folded back into retracted position, the linkage may be lowered sufficiently to re-anchor the stay bars with the pin 64.

Upon engagement of the rear coupling 40, further straightaway backing of the tractor causes the hitch mechanism to pivot either the ground wheel 71 of the hitch mechanism or the ground wheel of the coupled implement, thus swinging or jackknifing toward the forward end of the tractor to enter the coupling element 77 on the front frame member in the coupling element 65 on the tractor. Ordinarily the implement itself will be effective to hold the front frame member at a level permitting entry into the element 65. When the implement is not effective to so position the frame member, the latter may be blocked up to the required level by a jack or other suitable supporting means before the connection is effected. Upon final engagement of the coupling elements 67 and 65 the latch pin 69 is inserted and locked in place, thus completing the connection between the implement and the tractor.

With the detachable implement coupling arrangement provided by the invention, coupling of the hitch mechanism to an implement while the mechanism is associated with a tractor is a very simple operation. The uncoupled implement, of course, is supported by its ground wheel or wheels and jacks so as to locate the socket elements 90 and 91 in position to receive the pins 88 and 89 as the tractor is driven forwardly with the frame 30 running alongside the implement. Upon engagement of the first set of coupling elements the companion coupling elements including the sockets 92 and 93 and the connecting pins 94 and 95 may be engaged to complete the connection. Upon retraction of the jacks the tractor-implement combination is ready for use.

Disengagement of the implement from the hitch mechanism is effected by simply withdrawing the pins 94 and 95 and backing the tractor relative to the implement. It will be understood, of course, that before such disengagement the jacks will be extended to support the implement on the ground while disengaged.

As indicated above, either of the coupling arrangements provided for the hitch affords substantial advantages in the tractor-implement organization. On the one hand, the tractor may be quickly and easily freed for haulage purposes or other uses not involving semi-mounted implements. Alternatively, with the detachable implement coupling, the entire hitch mechanism may be switched from one implement to the other with a minimum of effort and without undue loss of time. This is particularly advantageous in the case of implements where power requirements necessitate supplementing the power of the tractor engine. In such cases, the auxiliary engine is readily transferable from implement to implement, in fact, such transfer is effected automatically upon interchange of implements.

The provision for disengaging the hitch mechanism from both the implement and the tractor has still other advantages. For example, it permits use of the auxiliary engine as a stationary power plant without tying up either the tractor or an implement. Locating the hitch mechanism for such use is simple as the tractor with the mechanism coupled thereto can be maneuvered into position very easily.

It will be apparent therefore that the invention provides a hitch mechanism of novel and advantageous construction which greatly simplifies the task of connecting a semi-mounted implement to a tractor. Moreover, the universal applicability of the hitch mechanism to various implements permits substantial simplification of the implement structure with a corresponding decrease in cost.

We claim as our invention:

1. A coupling device for connecting an implement to a hitch frame comprising a fitting adapted to be rigidly secured to the implement and defining a pair of sockets spaced apart laterally and having their axes respectively disposed horizontally and vertically, a pin supported on said fitting for endwise sliding movement into and out of said vertically disposed socket, said pin having rack teeth formed in one side, a pinion journaled on said fitting meshing with said rack teeth, and means for rotating said pinion.

2. A coupling device for connecting an implement to a hitch frame comprising a fitting adapted to be rigidly secured to the implement and defining a pair of sockets spaced apart laterally and having their axes respectively disposed horizontally and vertically, a pin supported on said fitting for endwise sliding movement into and out of said vertically disposed socket, said pin having rack teeth formed in one side, a pinion journaled on said fitting meshing with said rack teeth, a lever mounted to pivot about the axis of said pinion, and a pawl carried by said lever engageable with said pinion to rotate the same as said lever is rocked on its pivot.

3. Hitch mechanism for connecting a tractor to an implement mounted on an implement frame which has a rolling support on one side, said mechanism comprising the combination of a hitch frame adapted to be disengageably connected to the tractor and including a member extending along one side of the tractor, first and second coupling elements spaced fore and aft on said member, third and fourth coupling elements correspondingly spaced fore and aft on the implement frame and located on the opposite side of the latter from said rolling support, said first and third and said second and fourth coupling elements having means for matingly engaging respectively as said hitch frame and implement are moved relatively in a fore and aft direction, and means for releasably retaining said coupling elements in engaged relation and for restraining said hitch frame and the implement frame against relative pivotal movement about a fore and aft axis.

4. Hitch mechanism for connecting a tractor to any one of a plurality of implements mounted on implement frames which have rolling supports on one side thereof, said mechanism comprising the combination of a hitch frame having an intermediate portion and end portions projecting laterally therefrom, means on said end portions for disengageably connecting said frame to points spaced fore and aft of the tractor so that said intermediate portion extends longitudinally along one side of the tractor, first and second coupling elements spaced fore and aft on said intermediate portion, third and fourth coupling elements correspondingly spaced on each of the implement frames and located on the opposite sides of the latter from said rolling supports, said first and third elements and each of said second and fourth elements respectively having means for matingly engaging as said hitch frame and one of the implements are moved relatively in a fore and aft direction, and additional coupling elements on said intermediate frame portion and on each of said implement frames detachably engageable to restrain the hitch frame and implement against relative pivotal movement about a fore and aft axis.

5. The combination set forth in claim 4 further characterized in that said connecting means between said hitch frame and the tractor include pivot means to permit relative rocking about a fore and aft axis of the hitch frame and the tractor in traversing uneven ground.

6. Hitch mechanism for connecting a tractor to an implement mounted on an implement frame which has a rolling support on one side, said mechanism comprising the combination of a generally C-shaped hitch frame having means at the opposite ends thereof adapting it for disengageable connection at points spaced fore and aft to the tractor, first and second coupling elements spaced fore and aft on the intermediate portion of said hitch frame, third and fourth coupling elements correspondingly spaced fore and aft on the implement frame and located on the opposite side of the latter from said rolling support, said first and third and said second and fourth coupling elements having means for matingly engaging respectively as said hitch frame and implement are moved relatively in a fore and aft direction, means for restraining said frame and the implement against relative pivotal movement, means mounted on the rear end portion of said hitch frame for transmitting power to the implement, and a ground wheel associated with said hitch frame for supporting a part of the load imposed thereon by said power transmitting means.

7. Hitch mechanism for connecting a tractor having a power take-off shaft to an implement having a power input shaft projecting transversely therefrom, said implement being mounted on an implement frame which has a rolling support on one side, said mechanism comprising the combination of a hitch frame having an intermediate portion and end portions angled transversely to the intermediate portion, means on said end portions adapting said hitch frame for removable connection to the tractor with said intermediate portion extending along one side of the tractor, first and second coupling elements spaced fore and aft on said intermediate member, third and fourth coupling elements correspondingly spaced fore and aft on the implement frame and located on the opposite side of the latter from said rolling support, said first and third and said second and fourth coupling elements having means for matingly engaging respectively as said hitch frame and implement are moved relatively in a fore and aft direction, means restraining the frame and the implement against relative pivotal movement, a drive shaft journaled on the rear end portion of said hitch frame and adapted for driving connection to the power take-off shaft of the tractor, a second drive shaft journaled on the frame adjacent the junction of the intermediate and rear end portions thereof, means adapting said second drive shaft for connection to the implement input shaft, and means drivingly connecting said first and second drive shafts.

8. The combination set forth in claim 3 further characterized in that the rear end portion of said hitch frame is adapted for connection to the aft end of the tractor, and power transmitting elements are mounted on said hitch frame, said power transmitting elements including means for disengageable connection to the power take-off shaft of the tractor and to the implement.

9. Hitch mechanism for connecting a tractor in side-by-side relation to an implement mounted on an implement frame which has a rolling support on one side thereof, said implement having a power driven mechanism including an input shaft projecting laterally from the opposite side of said implement frame, said mechanism comprising the combination of a generally C-shaped hitch frame having an intermediate portion and having end portions adapted for removable connection respectively to the rear of the tractor and a point located forwardly of the tractor, first and second coupling elements spaced fore and aft on said intermediate portion, third and fourth coupling elements correspondingly spaced fore and aft on the implement frame and located on the opposite side of the latter from said rolling support, said first and third and said second and fourth coupling elements having means for matingly engaging respectively as said hitch frame and implement are moved relatively in a fore and aft direction, means for restraining said frame and the implement against relative pivotal movement, an auxiliary engine supported on the rear end portion of the hitch frame, and drive means for disengageably connecting said engine with the implement input shaft.

References Cited in the file of this patent

UNITED STATES PATENTS

| 1,121,962 | Williston | Dec. 22, 1914 |
| 1,245,168 | Wright | Nov. 6, 1917 |
| 1,467,573 | Engelhardt | Sept. 11, 1923 |
| 1,482,944 | Russ | Feb. 5, 1924 |
| 1,708,922 | Loots et al. | Apr. 9, 1929 |
| 1,999,841 | MacGregor | Apr. 30, 1935 |
| 2,207,812 | McClellan | July 16, 1940 |
| 2,212,465 | Baldwin | Aug. 20, 1940 |
| 2,406,668 | Cohen | Aug. 27, 1946 |
| 2,416,731 | Baldwin | Mar. 4, 1947 |
| 2,427,824 | Vutz | Sept. 23, 1947 |
| 2,617,673 | Sacks | Nov. 11, 1952 |